United States Patent
Potter

[11] 3,777,902
[45] Dec. 11, 1973

[54] WORKPIECE-GRIPPING REACH AND TURNOVER ATTACHMENT

[75] Inventor: Ronald D. Potter, Waterford, Mich.

[73] Assignee: Auto-Place, Inc., Troy, Mich.

[22] Filed: June 5, 1972

[21] Appl. No.: 259,757

[52] U.S. Cl............ 214/1 BB, 214/1 BC, 214/1 BD
[51] Int. Cl............................................. B66c 1/44
[58] Field of Search............ 214/1 BB, 1 BC, 1 BD, 214/1 B, 147 T, 147 G

[56] References Cited
UNITED STATES PATENTS

| | | | |
|---|---|---|---|
| 3,648,854 | 3/1972 | Potter | 214/1 BC |
| 3,682,327 | 8/1972 | Winne | 214/1 BC |

Primary Examiner—Gerald M. Forlenza
Assistant Examiner—George F. Abraham
Attorney—Willis Bugbee

[57] ABSTRACT

Adapted to be mounted upon a vertically-movable and horizontally-rotatable support shaft is a head structure containing parallel horizontal lower and upper guide bores. Slidably mounted in the upper guide bores is an elongated guide rod from the rearward end of which depends a mounting plate carrying a fluid-operated rotary actuator with a hollow output shaft having a circumferentially-adjustable drive connection with an elongated hollow arm shaft slidably mounted in the lower guide bore and having a fixed workpiece-gripping jaw secured to its outer end.

Mounted on the rearward end of the rotary actuator is a lower fluid-operated reciprocatory jaw-actuating motor, the lower piston rod of which is drivingly connected to a jaw-operating rod extending forward through the hollow output and hollow arm shaft to a movable workpiece-gripping jaw mounted thereon adacent the fixed workpiece-gripping jaw. Also mounted on the head structure is an upper fluid-operated reciprocatory reach motor, the upper piston rod of which is disposed parallel to the lower piston rod. Depending from the forward end of the upper piston rod is the upper end of a drag link, the lower end of which is operatively connected to the shaft arm to reciprocate the shaft arm while permitting relative rotation therebetween.

In operation the reach motor moves the hollow shaft arm back and forth by means of the drag link, the rotary actuator rotates the shaft arm and workpiece-gripping jaws through a predetermined angle, and the jaw-operating motor moves the movable jaw toward and away from the fixed jaw to grip or release the workpiece respectively.

10 Claims, 7 Drawing Figures

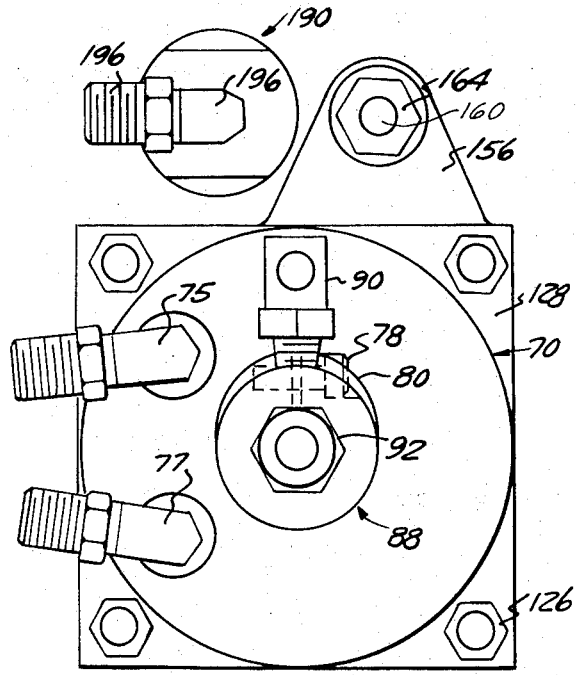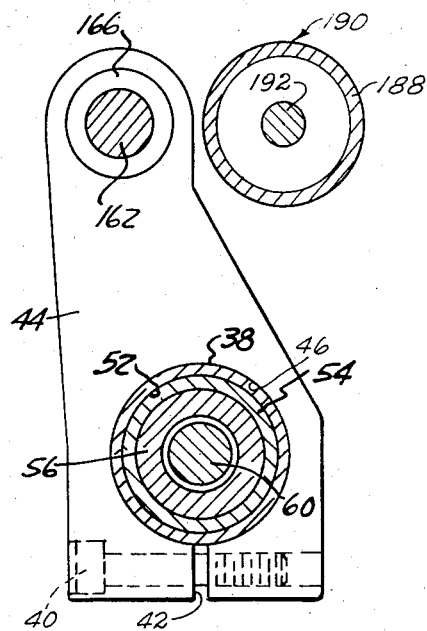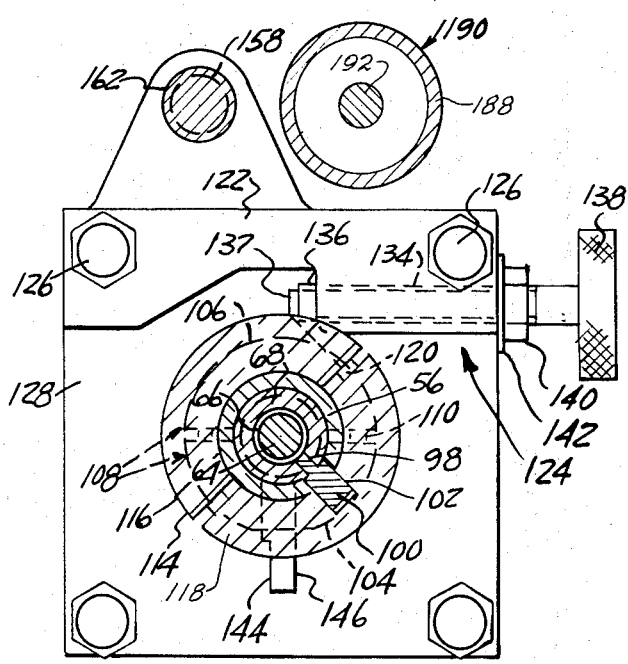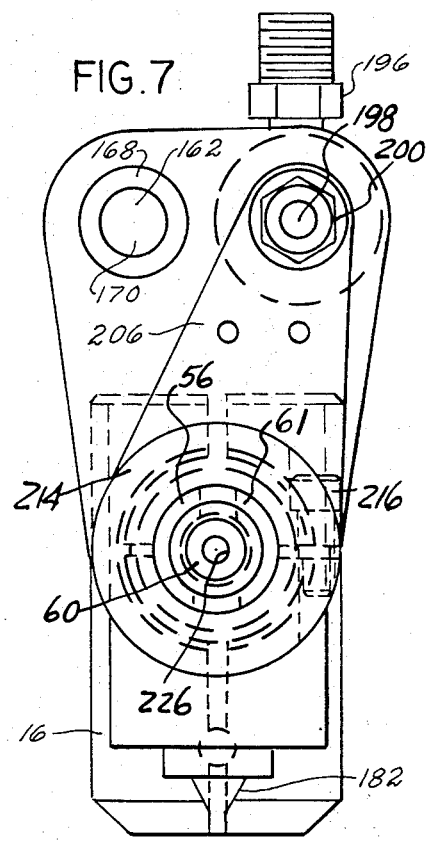

WORKPIECE-GRIPPING REACH AND TURNOVER ATTACHMENT

In the drawings,

FIG. 4 is a left-hand end elevation of the attachment shown in FIGS. 1 and 2;

FIG. 5 is a cross-section taken along the lines 5—5 in FIG. 3, but with the drive key rotated from 12 o'clock to four o'clock;

FIG. 6 is a cross-section taken along the lines 6—6 in FIG. 3; and

FIG. 7 is a right-hand end elevation of the attachment shown in FIGS. 1 and 2 but with the gripping jaws omitted.

Figure 2:
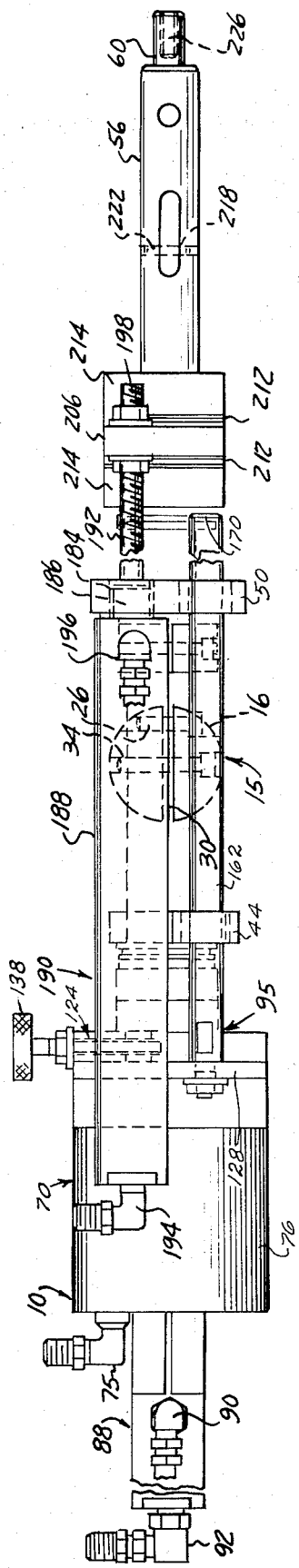
FIG. 2 is a top plan view of the attachment shown in FIG. 1, but with the gripping jaws omitted.
Figure 1:
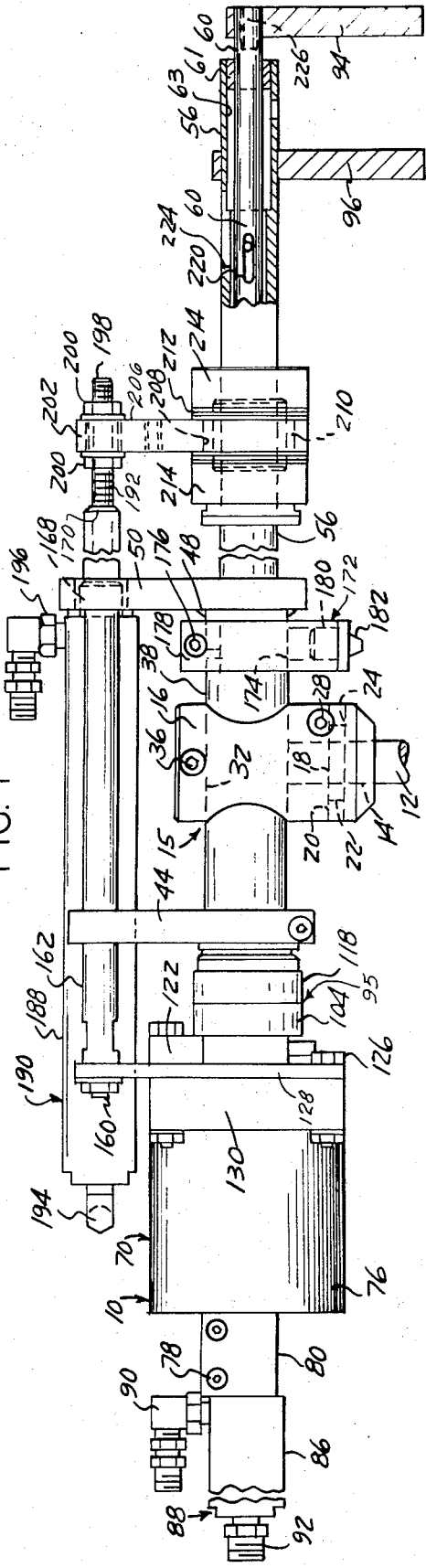
FIG. 1 is a side elevation of a workpiece gripping reach and turnover attachment in its extended position, according to one form of the invention, with the gripping jaws shown diagrammatically.

Referring to the drawings in detail, FIGS. 1 and 2 show a workpiece gripping reach-and-turnover attachment, generally designated 10, in its fully-extended or "reach" position, and adapted to be mounted upon a movable support indicated by the dotted line 12 in FIG. 1. Such a movable support, for example, may consist of that disclosed and claimed in the Kirsch and Robb U.S. Pat. No. 3,406,837 issued Oct. 22, 1968 for Lifting and Swinging Work Transfer Device, and its details are beyond the scope of the present invention. The support 12 may consist of the "transversely-drilled upper end 65 of the square piston rod 62" referred to in that patent. Bored as at 14 to receive the upper end of the support 12 is a carrier head structure, generally designated 15, including a carrier head 16. The support 12 and the head 16 are drilled radially at 18 and 20 respectively in alignment with one another to receive a drive pin 22 drivingly interconnecting the support 12 and the head 16. The lower portion of the head 16 is split radially at 24 as far inward as the bore 14, and is also drilled and threaded tangentially as at 26 (FIG. 2) to receive a lower clamping screw 28 by which the head 16 is tightly but removably secured to the support 12.

The supper portion of the head 16 is split longitudinally as at 30 (FIG. 2) downward as far as the lower end of a transverse bore 32 therein and is also drilled and threaded as at 34 near its upper end to receive an upper clamping screw 36. The carrier head structure 15 also includes a support bushing 38 which by the clamping screw 36 is tightly but adjustably secured in the bore 32 either for longitudinal or rotary adjustment, and further includes axially-spaced rearward and forward upstanding brackets 44 and 50 respectively. The rearward bracket 44 is adjustably and removably secured to the rearward end of the support bushing 38, as by a clamping screw 40 (FIG. 3) secured to and passing through the split lower end 42, and contains a bore 46 (FIG. 3) receiving the support bushing 38. The forward bracket 50 is similarly bored to receive the forward end portion of the support bushing 38 but is secured thereto as by welding at 48. The forward and rearward end portion of the support bushing 38 are counterbored as at 52 (only the rearward counterbore 52 being shown) to receive forward and rearward bearings 54. The bearings 54, for simplicity of disclosure, are shown as plain bearing bushings, but in actual practice ball bearings would preferably be used.

Rotatably mounted in the bearings 52 (FIG. 6) is an elongated hollow shaft or arm 56, the longitudinal bore 58 of which slidably and rotatably receive an extension rod 60. The forward end of the rod 60 is slidably supported in a bearing bushing 61 in a counterbore 63 in the hollow shaft 56. The rearward end of the rod 60 is drilled and threaded to receive the correspondingly-threaded reduced diameter forward end portion 62 of a piston rod or power output member 64 reciprocably mounted with the bore 66 of the hollow rotary shaft or rotary power output member 68 (FIG. 5) of a vane type rotary actuator, generally designated 70, having a driving vane 72. The vane 72 is arcuately movable within the rotary actuator bore 74 in the actuator housing 76, the vane 72 being drivingly connected to the rotary shaft or power output member 68. The rotary actuator 70 has compressed air hose connections or couplings 75 and 77 connected thereto. The actuator 70 is of a conventional type, available upon the open market, and its details are beyond the scope of the present invention.

Secured as by the bolts 78 within the radially split cylindrical boss 80 with an internal bore 82 is the reduced diameter forward end 84 of the casing 86 of a workpiece-gripping jaw-operating reciprocatory pneumatic motor 88. The boss 80 is secured to the casing 76 of the rotary vane actuator 70. The pneumatic motor 88 is provided with air hose connections or couplings 90 and 92 at its opposite ends for supplying air to reciprocate the piston (not shown) within the casing 86 and connected to the piston rod 64 which reciprocates the extension rod 60 through the threaded connection 62 therebetween. Fixedly mounted on the outer end of the extension rod 60 is a movable workpiece-gripping jaw 94 of any suitable type and configuration, depending upon the type and configuration of the workpieces to be gripped between it and a similar fixed workpiece-gripping jqw 96 fixedly secured in any suitable way to the rotatable hollow shaft or arm 56 near the outer end thereof. As a consequence, reciprocation of the piston rod 64 of the air cylinder reciprocatory pneumatic motor 88 causes the movable jaw 94 to move toward or away from the fixed jaw 96 so as to respectively grip or release a workpiece (not shown) held therebetween.

Figure 3:
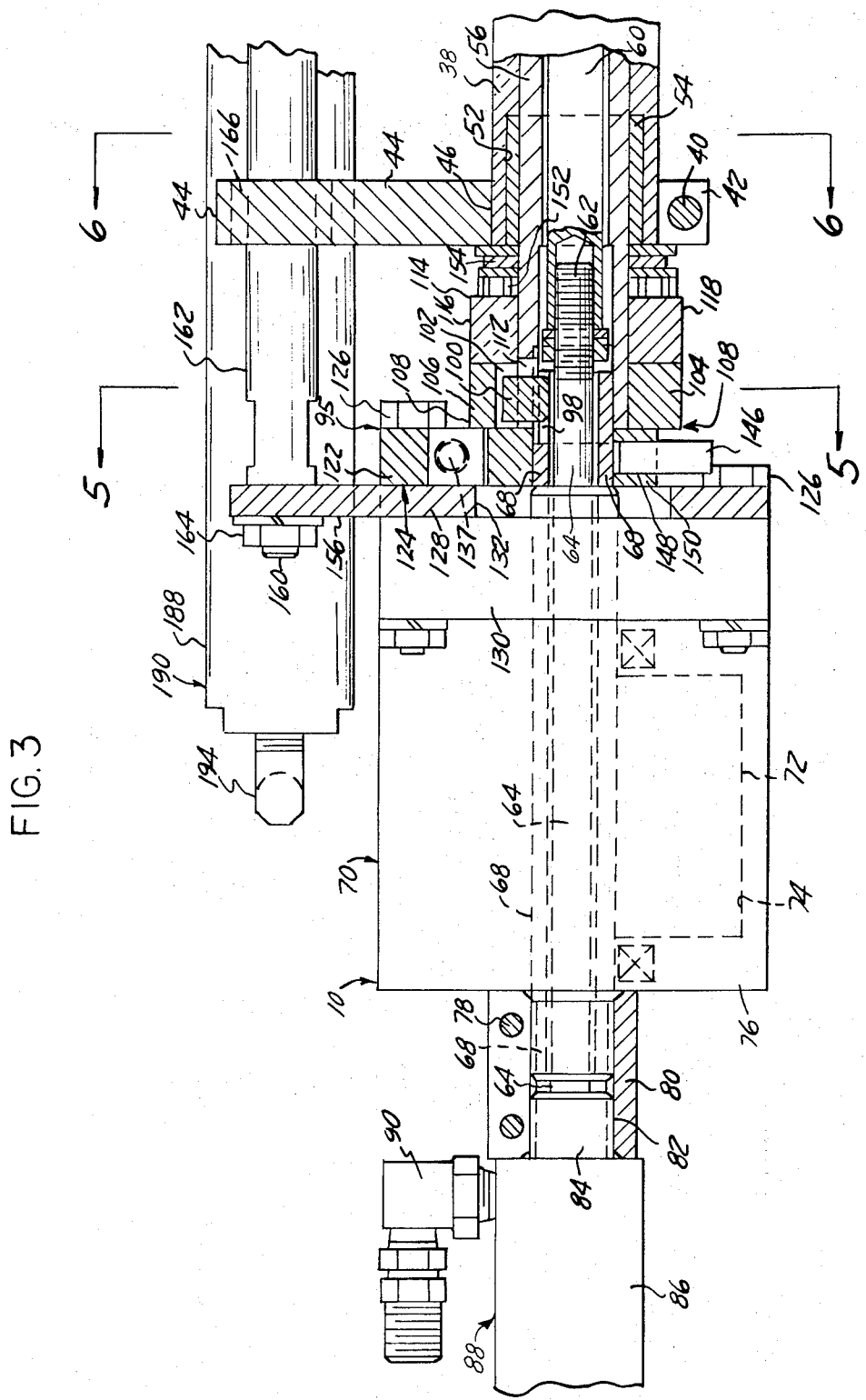
FIG. 3 is an enlarged side elevation, partly in longitudinal section, of the left-hand end portion of FIG. 1.

The rotary vane 72 of the rotary actuator 70 rotates the elongated hollow shaft or arm 56 and consequently the work-gripping arms 94 and 96 attached thereto by a driving connection and circumferentially adjustable coupling device, generally designated 95 shown in longitudinal section in the midportion of FIG. 3 and in cross-section in FIG. 5, the cross-section taken therethrough along the line 5—5 in FIG. 3. The hollow shaft 68 of the rotary actuator 70 is slotted longitudinally at 98 to receive the inner end of a radial drive key 100, the outer end of which is seated in a radial groove 102 in one of the halves 104 and 106 (FIG. 4) of a first split collar 108, the semi-annular halves of which are bolted together by chordal screws 110. The drive key 100 between the inner slot or keyway 98 and its seating groove 102 passes through a longitudinal slot or keyway 112 in the hollow shaft 56 so that the drive key 100 transmits rotary motion between the rotary actuator shaft 68 and the hollow shaft or arm 56 carrying directly the fixed jaw 96 and indirectly the movable jaw 94.

A second split collar 114 (FIG. 5), similar to the first split collar 108 and similarly having halves 116 and 118 bolted together by chordal screws 120, is secured to the hollow shaft 56 (FIG. 1) in abutting engagement with the split collar 108 and holds the latter firmly against the screw-holding arm 122 of a fine adjustment device, generally designated 124 (FIGS. 2, 3 and 5), the arm 122 being bolted as at 126 through a mounting plate 128 to the mounting flange 130 of the rotary actuator casing 76. The plate 128 is centrally apertured as at 132 for the passage of the rotary actuator shaft 68. The two uppermost bolts 126 hold the arm 122 in place, whereas the two lower bolts 126 pass directly through the plate 128 and rotary actuator casing flange 130 without passing through the arm 122 (FIG. 5).

The arm 122 has a drilled and threaded bore 134 disposed tangential to the split collar 108 and threadedly receives the threaded shank 136 of a fine adjustment stop screw 138. The shank 34 also carries a lock nut 140 and washer 142. Swingable into contacting engagement with the end 137 of the stop screw 138 is the flat end portion 144 (FIG. 5) of a stop pin 146, the inner end of which is seated in a radial bore 148 (FIG. 1) in a third split collar 150 similar to the first and second split collars 108 and 114 and similarly bolted to the rotary actuator shaft 68 rather than to the hollow shaft 56.

As a consequence of the construction just described, a coarse adjustment between the rotary actuator shaft 68 and the elongated hollow shaft 56 carrying and actuating the workpiece-gripping jaws 94 and 96 is obtained by loosening the chordal clamping screws of the third split collar 150 and then rotating the collar 150 to the desired location, after which its clamping screws are tightened. The fine adjustment is then made by loosening the lock nut 140 (FIG. 5) and then turning the stop screw 138 so as to move its inner end 137 backward or forward to alter the location at which the flat spot 144 on the stop pin 146 engages the end 137. The lock nut 140 is then tightened to lock the fine adjustment stop screw 138 in its adjusted position. A needle thrust bearing 152 is mounted on the hollow shaft 56 and shielded from shock by an elastomeric cushioning ring or washer 154 (FIG. 3).

The upper or outer end of the plate 128 is provided with an upstanding arm 156 (FIGS. 1, 2, 3 and 4) which is bored at 158 for the passage of the reduced-diameter threaded end 160 of a guide rod 162 which is locked in position against the arm 156 of the plate 128 by a nut 164. The rearward and forward brackets 44 and 50 (FIG. 1) are bored coaxial with the guide rod 162 to receive slide guide bearings 166 and 168 respectively for providing sliding bearing engagement with the guide rod 162. The latter has a free outer end 170. Also mounted on the support bushing 38 (FIG. 1) between the head 16 and the fixed bracket 50 is an adjustable locating arm 172 bored at 174 to receive the support bushing 38 and having a split upper end spanned by a clamping screw 176 which is threaded into one side of the split portion 178 in order to clamp the locating arm 172 in its adjusted position. The end of the locating arm 172 opposite its split end is drilled as at 180 to snugly receive the shank of a flanged pointed locating pin 182.

The forward or fixed bracket 50 is bored and threaded at 184 (FIG. 2) to receive the correspondingly threaded reduced diameter forward and 186 of the cylinder 188 of a reciprocatory pneumatic reach motor, generally designated 190, containing a piston head (not shown) connected to the rearward end of a piston rod 192. The cylinder 188 is bored and threaded at its forward and rearward ends to receive compressed air hose or pipe connections 194 and 196 respectively by the admission and discharge of air from which the piston and consequently the piston rod 192 is reciprocated.

The forward end 198 of the piston rod 192 (FIGS. 1, 2 and 7) is threaded to receive lock nuts 200 and passes loosely through a slightly larger bore 202 with a clearance therebetween for compensation of any slight misalignment which might occur therebetween. A bushing 204 is associated with the loose connection thus provided between the piston rod 192 and a drag link 206 by which force is transmitted between the reach piston rod 192 and the hollow shaft 56. The lower end of the drag link 206 is bored as at 208 to receive an antifriction bearing unit 210, such as a needle bearing unit, for rotatably receiving the hollow shaft 56. Mounted on the hollow shaft 56 on the forward and rearward sides of the drag link 206 are antifriction thrust bearings 212 held in position by split stop collars 214 (FIG. 6) and chordal clamping screws 216 extending through and across the gap between the split portions thereof.

The forward end portion of the hollow shaft 56, slightly to the rear of the fixed work-gripping jaw 96, is drilled transversely as at 218 (FIG. 2) and the extension rod 60 is slotted longitudinally in alignment therewith as at 220 to receive a crosspin 222 which drivingly interconnects the hollow shaft 56 and extension rod 60 while permitting relative longitudinal motion therebetween during the opening and closing of the movable work-gripping jaw 94 relatively to the fixed jaw 96. An elongated slot 224 in the forward end portion of the hollow shaft 56 opens onto the extension rod 60 above the crosspin 222. The forward end of the extension rod 60 is provided with a drilled and threaded socket 226 for the attachment of the jaw 94.

Prior to operating the device 10 of the invention, let it be assumed that it has been installed in the desired location relatively to an unmachined workpiece supply station (not shown) and to the machine which it is to serve, such as by mounting the socket 14 of the head 16 upon the support 12 and locking it thereto by tightening the lower clamping screw 28 (FIG. 1). Let it also be assumed that the device 10 has been adjusted to adapt it to the conditions of use imposed by the workpiece transfer to be accomplished, namely the particular amount of rotation to be imposed upon the workpiece during its insertion and withdrawal from the work-processing machine being served by this device. This adjustment has been described above, hence it is believed unnecessary to repeat it here.

Let it also be assumed that the air hose couplings 75 and 77 of the rotary actuator 70, 90 and 92 of the jaw-operating reciprocatory motor 88, and 194 and 196 of the reciprocatory reach motor 190 have been connected to a source of compressed air by way of a suitable conventional compressed air control system containing air valves operated in timed relationship (not shown). Let it also be assumed that the support 12 has been constructed and arranged to rise and fall as well as to swing laterally to and fro in similarly timed relationship, as stated above to be disclosed and claimed in the Kirsch and Robb U.S. Pat. No. 3,406,837 of Oct. 22, 1968. Let it finally be assumed that the drag link 206 is in its retracted position adjacent the fixed forward bracket 50.

In the operation of the workpiece-gripping reach and turnover device 10, the operator, after assuring himself that an adequate supply of workpieces is positioned within the range of operation of the device, starts the device in operation by energizing the control system thereof. In accordance with the commands of the control system, the movable support 12 swings into position over the workpiece supply station, such as on a conveyor, moves downward to bring the now-open workpiece-gripping jaws 94 and 96 into a position spanning a workpiece to be machined. The control system then supplies compressed air through the coupling 90 of the reciprocatory jaw-operating motor 88 and at the same time exhausts air from the coupling 92 thereof, whereupon the piston rod 64 and extension rod 60 connected thereto are retracted to the left (FIGS. 1, and 3), thereby closing the jaws 94 and 96 upon a workpiece to be machined.

The control system then operates to raise the movable support 12 and to rotate it so as to swing the hollow shaft 56 carrying the closed jaws 94, 96 and the workpiece into the working zone of the served machine where the machining is to take place. Meanwhile, the control system has supplied compressed air to one of the couplings 75 or 77 of the rotary actuator 70 while exhausting air from the other of said couplings in order to rotate the rotary hollow shaft 56 and swing the jaws 94 and 96 containing the workpiece into the desired position for machining. While this has been going on, additional reach is provided in order to move the workpiece and its jaws 94, 96 outward a sufficient distance away from the movable support 12 to move the jaws 94, 96 and workpiece into the operating zone of the served machine. This is accomplished when the control system operates control valves to supply compressed air to the coupling 194 of the reciprocatory reach motor 190 and exhaust it from the coupling 196 thereof. As a result, the drag link 206 (FIG. 1) moves outward to the right from its retracted position adjacent the forward fixed bracket 50 to its extended position shown in FIG. 1 in response to the forward motion of the piston rod 192, thereby moving the jaws 94 and 96 containing the workpiece into the operating zone of the served machine.

If the control system is required to cause the hollow shaft 56 to swing the jaws 94 and 96 at this time, the control system supplied compressed air to the proper one of the couplings 77 and 75 of the rotary actuator 70 and to exhaust air from the other such coupling, whereupon the vane 72 of the rotary actuator 70 rotates the hollow shaft 56 in the proper direction to swing the workpiece-containing jaws 94, 96 into position for machining. The control system then actuates the movable support 12 to move it downward into machining position for the workpiece, whereupon the control system supplies compressed air to the coupling 92 and exhausts it from the coupling 90 to cause the reciprocatory jaw-operating motor 88 to move the piston rod 64 and extension rod 60 outward to the right to move the jaw 94 away from the jaw 96 and release the workpiece.

The control system now actuates the movable support 12 to move it upward and at the same time or immediately thereafter to swing the hollow shaft 56 and its now open jaws 94 and 96 out of the machining position and back into position over the next workpiece to be machined, whereupon the foregoing sequence of operation is repeated indefinitely. Meanwhile, another device 10 installed adjacent the one previously described and operating in a similar manner, removes the machined workpiece from the served machine after the machining operation thereon has been completed, in order to make way for the next unmachined workpiece to be brought into the machining zone of the served machine.

Summarizing the foregoing description of the construction and operation of the workpiece-gripping reach and turnover attachment 10 of this invention, the rearward and forward upstanding brackets 44 and 50, and the support bushing 38 mounted on the carrier head 16, remain stationary when the reciprocatory reach motor 190 is actuated to cause its piston rod 192 to move the drag link 206 and hollow shaft or arm 56 to the right into the extended or jaw-opening position shown in FIGS. 1, 2 and 3. At the same time (FIG. 3), the hollow shaft or arm 56 pulls the rotary actuator 70 to the right through its connection thereto through the key 100 of the coupling device 95. The rotary actuator 70 can thus be operated to rotate the hollow shaft or arm 56 at any time. As the rotary actuator 70 is thus moved to the right, it carries with it the jaw-operating pneumatic motor 88. At the same time, the plate 128 and arm 156 carrying the rotary actuator 70 cause the guide rod 162 to move forward to the right in its slide guide bushings 166 and 168. In the reverse action, the reversal of the reciprocatory reach motor 190 retracts its piston rod 192 to the left, closes the jaws 94 and 96 upon a workpiece, and at the same time retracts the hollow shaft or arm 56, the coupling 95, the rotary actuator 70, the reciprocatory jaw-operating motor 88, the plate 128, its arm 156 and the guide rod 162 to the left.

I claim:

1. A workpiece-gripping reach and turnover attachment for a vertically-movable rotatable support, said attachment comprising an upstanding head structure adapted to be mounted on said support for motion therewith and having horizontal lower and upper slide guide bearing means disposed in vertically-spaced parallel relationship, an elongated guide member having a first portion slidably mounted in said upper slide guide bearing means and a second portion projecting laterally therefrom, an elongated hollow arm slidably and rotatably mounted in said lower slide guide bearing means, a rotary power actuator mounted on said second portion of said guide member and having a rotary power output member, a coupling device drivingly connecting said rotary power output member to said arm, a jaw-operating reciprocatory motor mounted adjacent said rotary actuator and having a reciprocatory power output structure extending therefrom through said hollow arm to the outer end thereof, a first workpiece-gripping jaw mounted on said arm adjacent said outer end, a second workpiece-gripping jaw mounted on said reciprocatory power output structure adjacent said first jaw, an arm-shifting reciprocatory motor mounted on said head structure and having a reciprocatory power output element extending therefrom parallel to said guide member, and means operatively connecting said power output element to said arm for reciprocating said arm in response to the reciprocation of said power output element.

2. A workpiece-gripping reach and turnover attachment, according to claim 1, wherein said head structure includes a head having a horizontal tubular member and wherein said upper slide bearing means includes a pair of spaced parallel upstanding bracket members mounted thereon with aligned bearing bores therethrough disposed on an axis parallel to the axis of said tubular member, said guide member being slidably mounted in said bearing bores.

3. A workpiece-gripping reach and turnover attachment, according to claim 1, wherein said rotary power output member is hollow, wherein said jaw-operating reciprocatory motor is mounted rearwardly of said rotary actuator, and wherein said power output structure includes a power output member extending from said jaw-operating motor through said hollow rotary power output member.

4. A workpiece-gripping reach and turnover attachment, according to claim 1, wherein said operatively connected means for reciprocating said arm includes a drag link secured to said power output element and extending into proximity to said arm and also includes axially-spaced stops disposed on said arm on opposite sides of said drag link.

5. A workpiece-gripping reach and turnover attachment, according to claim 4, wherein thrust bearings are disposed between said stops and said drag link.

6. A workpiece-gripping reach and turnover attachment, according to claim 2, wherein said arm-shifting reciprocatory motor is mounted on at least one of said bracket members.

7. A workpiece-gripping reach and turnover attachment, according to claim 1, wherein said reciprocatory motors are fluid-operated motors.

8. A workpiece-gripping reach and turnover attachment, according to claim 1, wherein said coupling device includes a circumferentially-adjustable connection disposed between said rotary power output member and said arm.

9. A workpiece-gripping reach and turnover attachment, according to claim 8, wherein said circumferentially-adjustable connection includes a radial stop element connected to said arm and a circumferentially-spaced cooperating stop element connected to said second portion of said guide member.

10. A workpiece-gripping reach and turnover attachment, according to claim 9, wherein said circumferentially-spaced stop element includes a fine adjustment stop screw device disposed between said second portion of said guide member and said radial stop element.

* * * * *